(12) United States Patent
Chi et al.

(10) Patent No.: US 12,724,499 B2
(45) Date of Patent: Sep. 1, 2026

(54) CAPACITIVE STYLUS

(71) Applicant: BENQ CORPORATION, Taipei City (TW)

(72) Inventors: Chin-Jui Chi, Taipei City (TW); Ta-Wei Liu, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 0 days.

(21) Appl. No.: 19/221,443

(22) Filed: May 28, 2025

(65) Prior Publication Data

US 2026/0194993 A1 Jul. 9, 2026

(30) Foreign Application Priority Data

Jan. 3, 2025 (TW) ................................ 114100325

(51) Int. Cl.
*G06F 3/0354* (2013.01)

(52) U.S. Cl.
CPC ................................ *G06F 3/03545* (2013.01)

(58) Field of Classification Search
CPC ................................................... G06F 3/03545
See application file for complete search history.

(56) References Cited

U.S. PATENT DOCUMENTS 5,109,141 A * 4/1992 Purcell ................ G06F 3/03545 178/19.04
5,914,708 A * 6/1999 LaGrange ........... G06F 3/03545 178/19.03
2009/0277697 A1* 11/2009 Bolt ...................... G06F 3/0412 178/19.01
2014/0218338 A1* 8/2014 Kim .................... G06F 3/03545 345/174
2016/0291706 A1* 10/2016 Trutna .................... H02J 7/225
2016/0370887 A1* 12/2016 Yang ................... G06F 3/03545

* cited by examiner

*Primary Examiner* — Priyank J Shah
(74) *Attorney, Agent, or Firm* — Winston Hsu

(57) ABSTRACT

A capacitive stylus is applied to a touch panel and includes a main body and a conduction module. The main body has an opening structure, a tip portion and a tail portion. The opening structure is located between the tip portion and the tail portion. The conduction module includes a first end portion, a body portion and a control portion. The first end portion is disposed on the tip portion or the tail portion, and used to contact the touch panel for generating an operation command. The body portion is movably disposed inside the main body. The control portion is disposed inside the opening structure and connected with the body portion, and used to contact the body portion against the first end portion or space the body portion from the first end portion.

18 Claims, 8 Drawing Sheets

CAPACITIVE STYLUS

BACKGROUND OF THE INVENTION

1. Field of the Invention

The present invention relates to a capacitive stylus, and more particularly, to a capacitive stylus of providing a variety of operation commands.

2. Description of the Prior Art

A conventional capacitive stylus utilizes the capacitance sensing change generated when the tip of the stylus contacts the touch panel to compute the exact position and movement trajectory of the tip on the touch panel, thereby converting the exact position and the movement trajectory into the operation command for controlling the application of the touch panel. However, the conventional capacitive stylus only writes text or draws patterns by simply computing the exact position and the movement trajectory of the tip on the touch panel. If the writing function of the capacitive stylus is changed to the erase function, the user needs to click the corresponding switch program on the touch panel to erase the text or the pattern according to the movement trajectory of the tip on the touch panel. Therefore, the conventional capacitive stylus only provides the single capacitance sensing change to generate the relatedoperation command; if a property of the operation command needs to be changed (e.g., from the writing function to the erase function), the relevant settings must be made on the touch panel, which has a drawback of inconvenient operation.

SUMMARY OF THE INVENTION

The present invention provides a capacitive stylus of providing a variety of operation commands for solving above drawbacks.

According to the claimed invention, a capacitive stylus is applied to a touch panel. The capacitive stylus includes a main body and a conduction module. The main body includes an opening structure, a tip portion and a tail portion. The opening structure is located between the tip portion and the tail portion. The conduction module includes a first end portion, a body portion and a control portion. The first end portion is disposed on the tip portion or the tail portion, and adapted to contact the touch panel for generating an operation command. The body portion is movably disposed inside the main body. The control portion is disposed inside the opening structure and connected with the body portion, and adapted to contact the body portion against the first end portion or space the body portion from the first end portion.

The capacitive stylus of the present application can place the first end portion, the second end portion, the body portion and the control portion of the conduction module respectively at different positions of the main body. The first end portion and the second end portion can be fixed at the tip portion and the tail portion of the main body. The body portion can contact against or be spaced from the first end portion and the second end portion in accordance with a movement of the control portion. The first end portion and the second end portion of the capacitive stylus can respectively contact against the touch panel, and the capacitive stylus can generate different operation commands due to material properties of elements of the conduction module. The body portion can optionally contact against or be spaced from the first end portion and the second end portion, or the external object can contact against or be spaced from the control portion, and the capacitance sensing changes caused thereby can provide more types of the operation command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
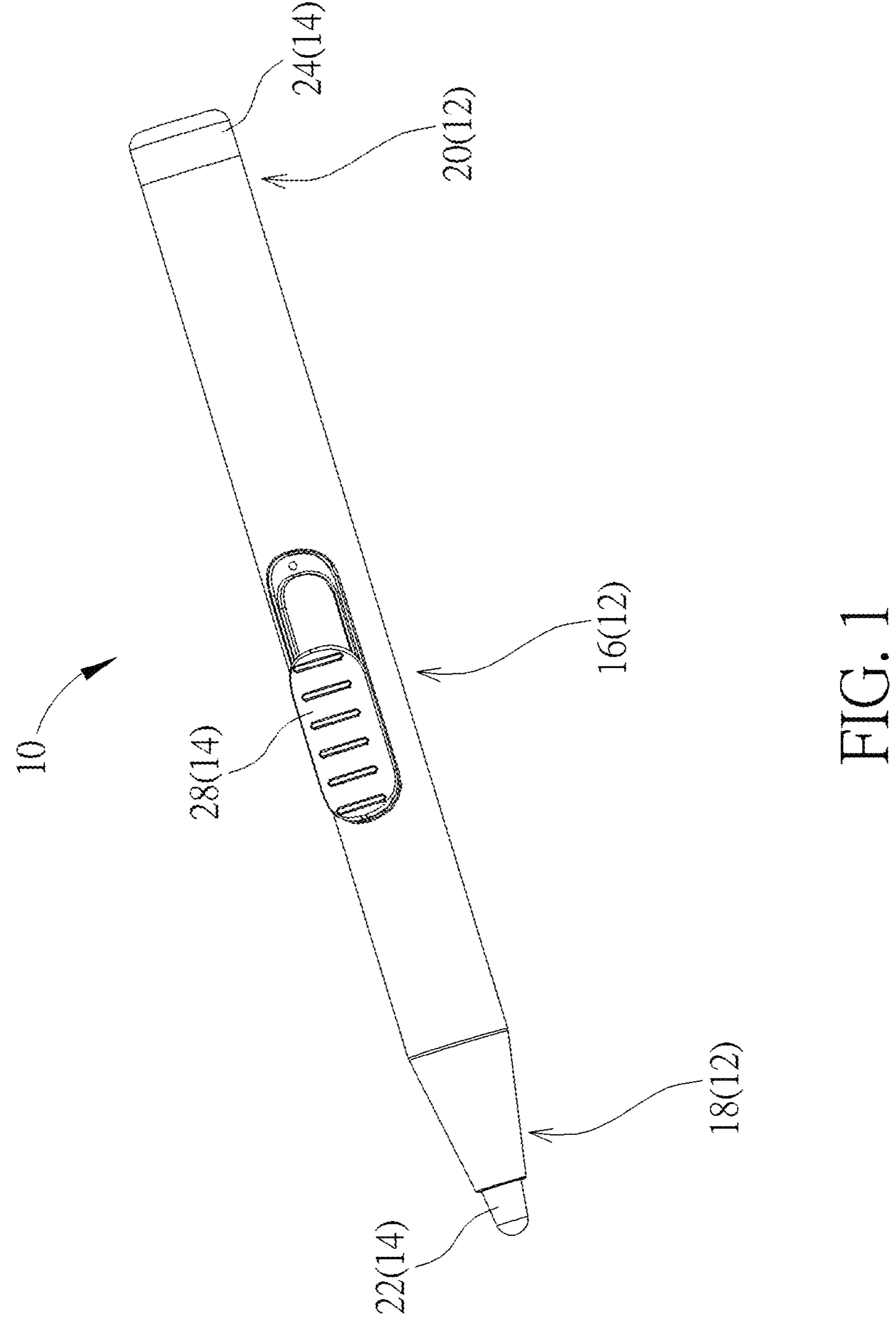
FIG. 1 is an appearance diagram of a capacitive stylus according to an embodiment of the present application.
Figure 2:
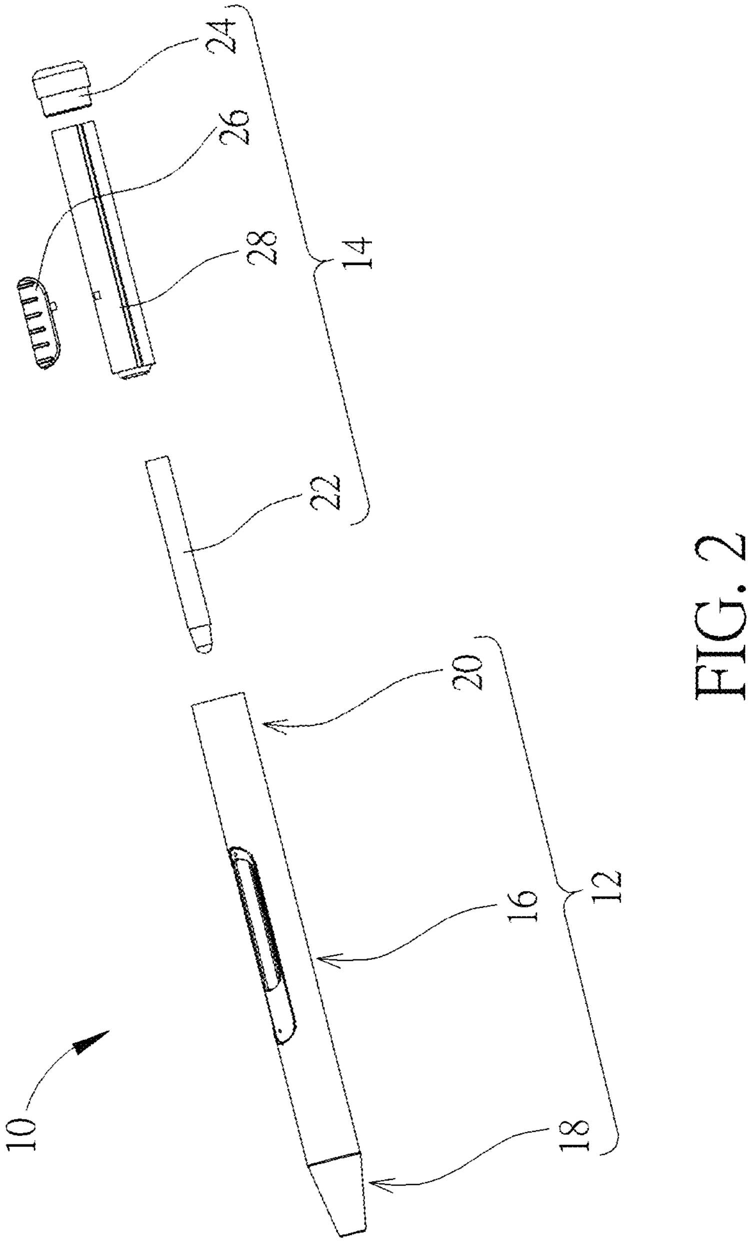
FIG. 2 is an exploded diagram of the capacitive stylus according to the embodiment of the present application.

Please refer to FIG. 1 and FIG. 2. FIG. 1 is an appearance diagram of a capacitive stylus 10 according to an embodiment of the present application. FIG. 2 is an exploded diagram of the capacitive stylus 10 according to the embodiment of the present application. The capacitive stylus 10 can be applied for a touch panel, and write text, draw patterns, or control applications on a touch surface of the touch panel. The touch panel can be a common touch device and therefore not shown in the figures. The capacitive stylus 10 can include a main body 12 and a conduction module 14. The conduction module 14 can be disposed inside the main body 12, and can provide touch interfaces on two opposite ends and a middle of the main body 12, so that the capacitive stylus 10 can generate a variety of operation instructions.

The main body 12 can include an opening structure 16, a tip portion 18 and a tail portion 20. The opening structure 16 can be located between the tip portion 18 and the tail portion 20. Generally, the opening structure 16 can be located on a position where a thumb of a user is placed when holding the main body 12, but an actual application is not limited thereto. The conduction module 14 can optionally include a first end portion 22, a second end portion 24, a body portion 26 and a control portion 28. The first end portion 22 can be defined as the tip portion 18 or the tail portion 20; accordingly, the second end portion 24 can be defined as the tail portion 20 or the tip portion 18. In one embodiment, the first end portion 22 and the second end portion 24 can be respectively set as the tip portion 18 and the tail portion 20. Positions of the first end portion 22 and the second end portion 24 can be interchanged, and shapes of the first end portion 22 and the second end portion 24 can be decided according to corresponding design of its placement position (such as being placed at the tip portion 18 or the tail portion 20).

The body portion 26 can be movably disposed inside a hollow area of the main body 12. The control portion 28 can be disposed on the opening structure 16 and connected with the body portion 26. In other words, the body portion 26 can be hidden inside the main body 12. A part of the control portion 28 can be exposed via the opening structure 16 for being pressed and operated by the user. Most part of the control portion 28 can be hidden inside the main body 12 and connected with the body portion 26 for linked action. Some or all of the first end portion 22, the body portion 26 and the control portion 28 can be optionally made by conductive material. The second end portion 24 can be preferably made by the conductive material in accordance with a design demand of the capacitive stylus 10, but can further be made by non-conductive material in accordance with an actual demand.

In the present application, the first end portion 22 and the second end portion 24 can be contact surfaces of the capacitive stylus 10, and can be made by rubber material; preferably, the first end portion 22 and the second end portion 24 can be made by conductive rubber material, such as silicone, nanofiber, graphene compound, ABS conductive composite material and other materials with conductive or semiconductor properties. The body portion 26 and the control portion 28 can be made by metal material, such as silver, annealed copper, aluminum alloy and other pure metal or metal compound materials, but the actual application is not limited thereto. Accordingly, electrical conductivity of the first end portion 22 and the second end portion 24 (which are made by the rubber material) can be less than electrical conductivity of the body portion 26 and/or the control portion 28 (which is made by the metal material), but the actual application is not limited thereto. The user mainly operates the capacitive stylus 10 by pressing the control portion 28, and hardness of the control portion 28 can be preferably greater than hardness of the body portion 26 to provide a comfortable operation feel. The hardness of the body portion 26 can be preferably greater than hardness of the first end portion 22 and/or the second end portion 24, and the body portion 26 can generate appropriate force feedback when pushing the first end portion 22 or the second end portion 24.

Please refer to FIG. 3 to FIG. 8. FIG. 3 to FIG. 8 are diagrams of the capacitive stylus 10 in different operation modes according to the embodiment of the present application. In the preferred embodiment, the first end portion 22 can be disposed on the tip portion 18, and used to contact the touch panel for generating an operation command when the user holds the capacitive stylus 10 in a forward direction. The second end portion 24 can be disposed on the tail portion 20, and used to contact the touch panel for generating other operation command when the user holds the capacitive stylus 10 in reverse. The user can push the control portion 28 to drive the body portion 26 to contact against or be spaced from the first end portion 22 and the second end portion 24, thereby generating the various operation commands.

Figure 3:
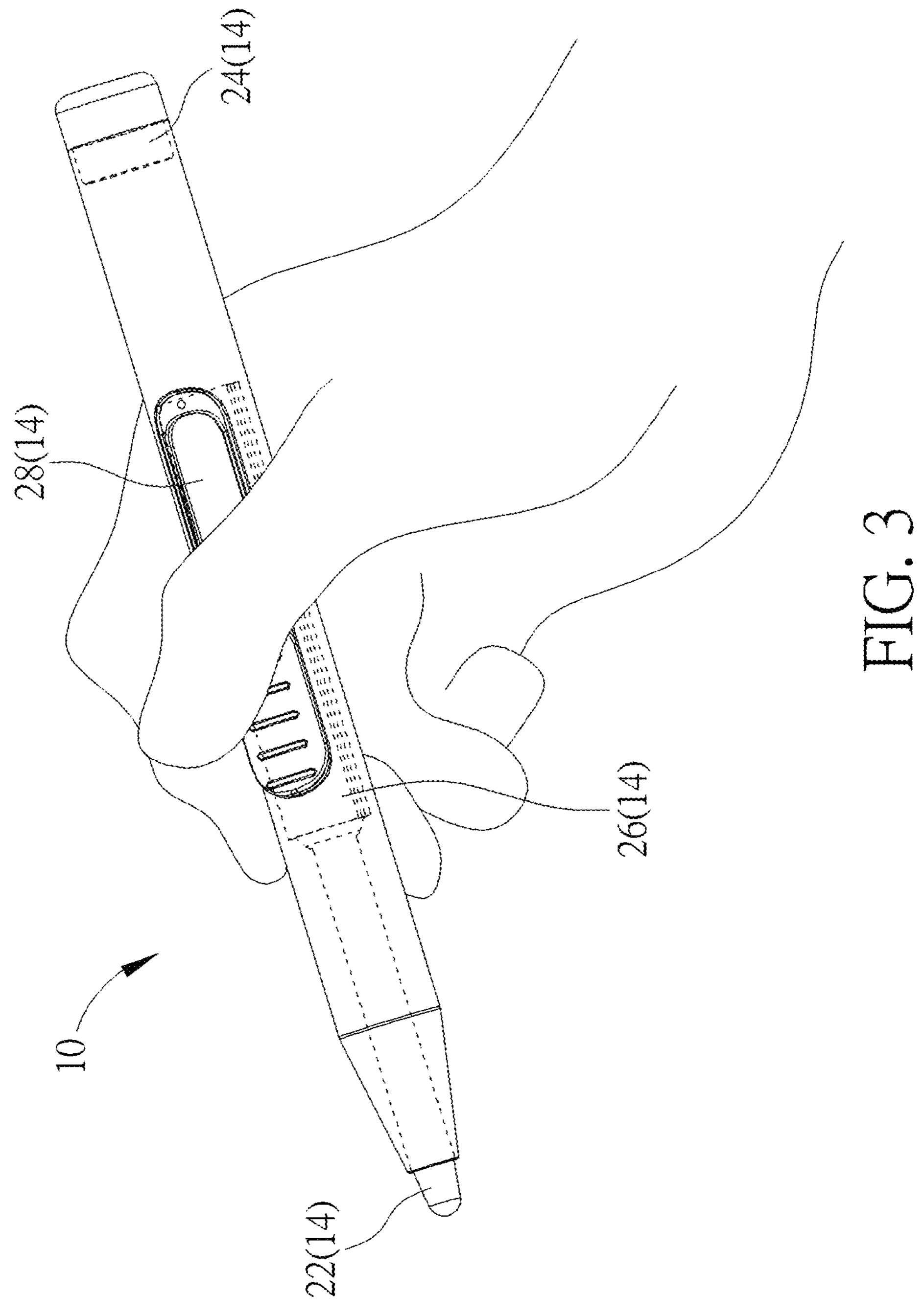
FIG. 3 to FIG. 8 are diagrams of the capacitive stylus in different operation modes according to the embodiment of the present application.

In the present application, the capacitive stylus 10 can configure the first end portion 22, the second end portion 24, the body portion 26 and the control portion 28 in the conduction module 14, and the conduction module 14 can provide different capacitance sensing changes by position change of the body portion 26. The capacitive stylus 10 of the present application can provide at least following sensing examples, but the actual application is not limited thereto. For example, as shown in FIG. 3, the user can hold the capacitive stylus 10 in the forward direction and push the control portion 28 forward (i.e., being closed to the tip portion 18), and the first end portion 22 can contact the touch panel, and the body portion 26 can be stayed in a position of contacting the first end portion 22, and the control portion 28 is not pressed by an external object (such as the user's finger). In the embodiment, the touch panel can be affected by the first end portion 22, the body portion 26 and the control portion 28 to generate the related operation command, for writing the text, drawing the pattern, and/or controlling the application.

Figure 4:
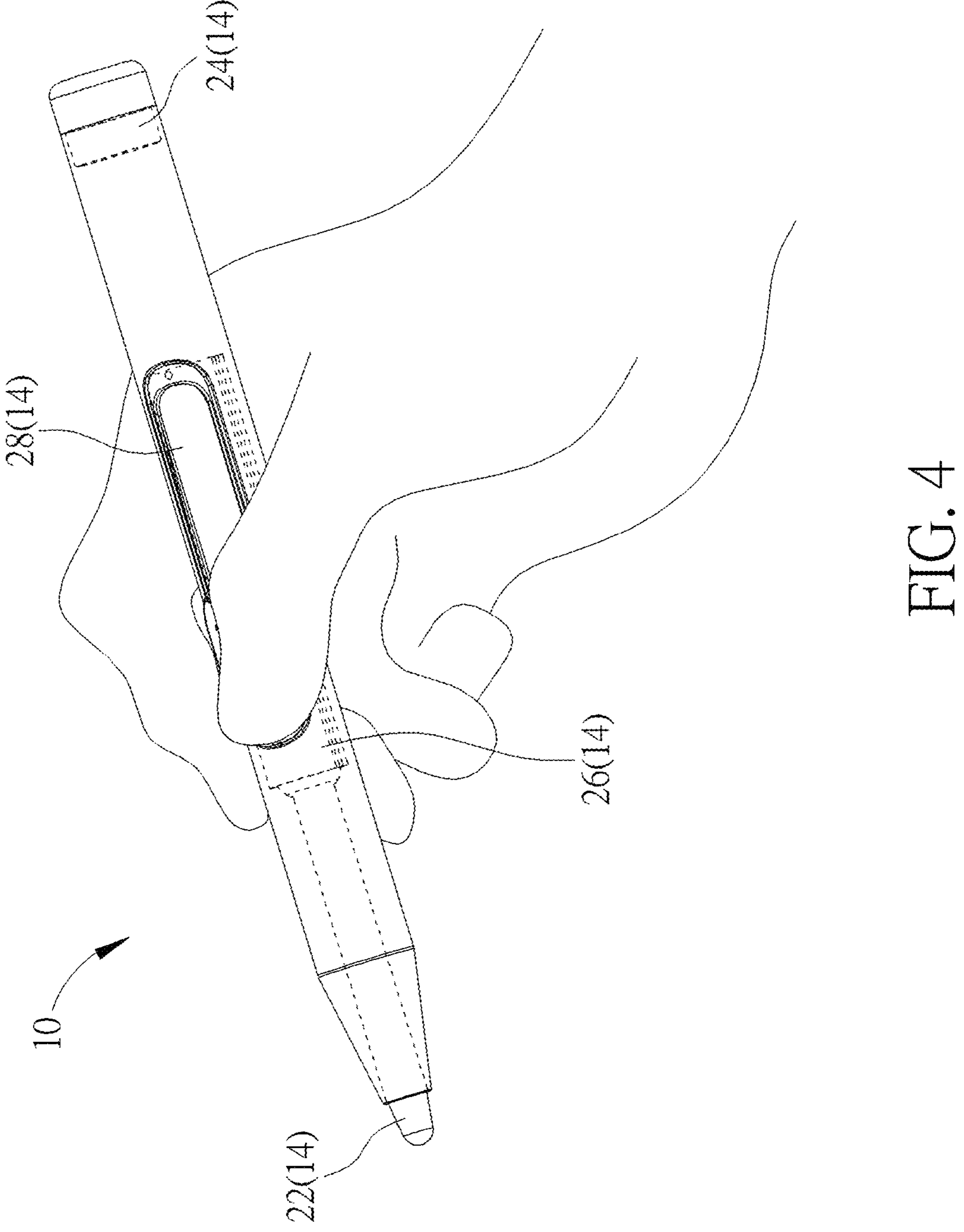
Figure 5:
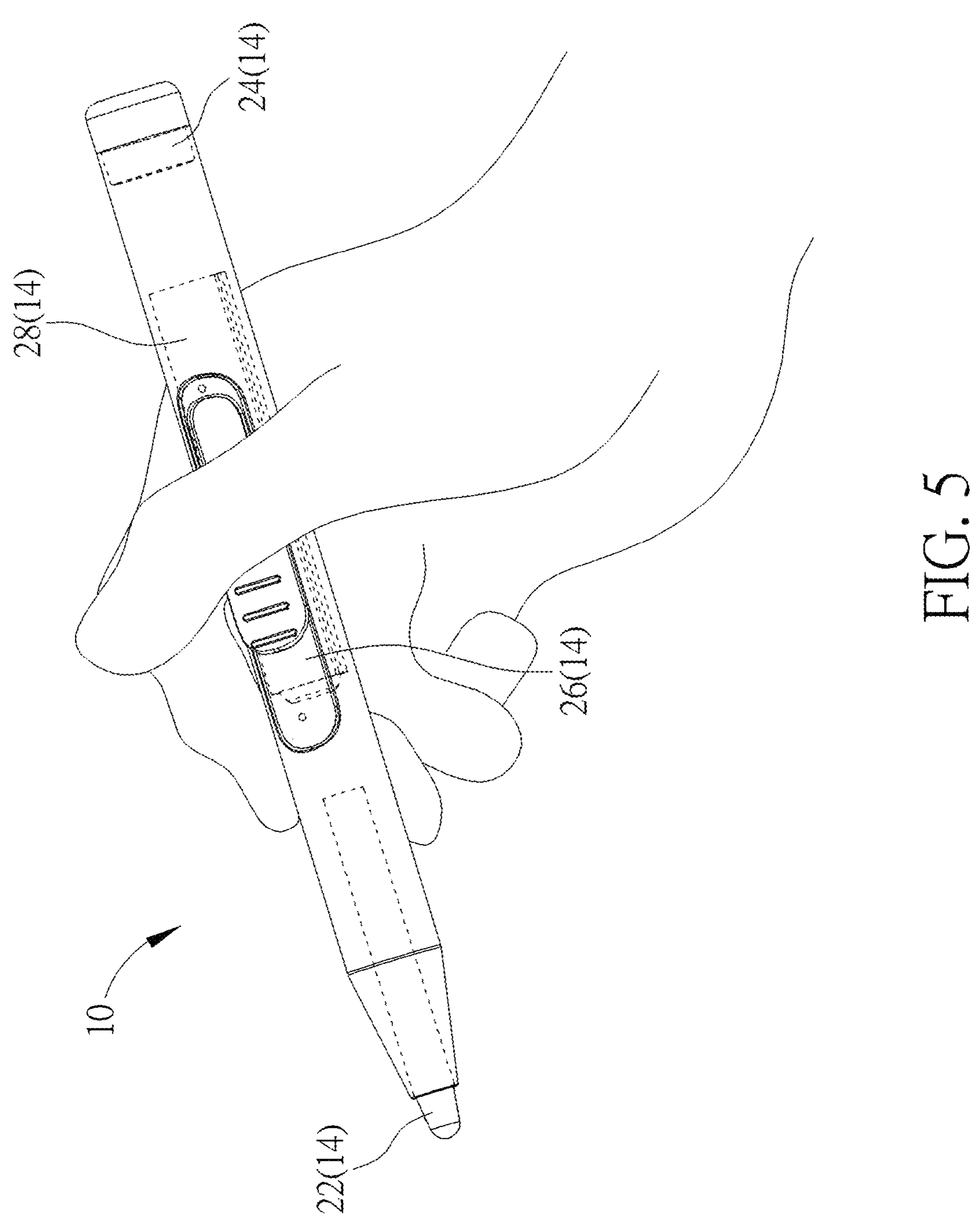

As shown in FIG. 4, the user can hold the capacitive stylus 10 in the forward direction and push the control portion 28 forward, and the first end portion 22 can contact the touch panel, and the body portion 26 can be stayed in the position of contacting the first end portion 22, and the control portion 28 is pressed by the external object (such as the user's finger). In the embodiment, the touch panel can be affected by the first end portion 22, the body portion 26, the control portion 28 and the external object to generate the related operation command. As shown in FIG. 5, the user can hold the capacitive stylus 10 in the forward direction to contact the first end portion 22 against the touch panel, and the control portion 28 can be positioned on a middle of the opening structure 16 so that the body portion 26 is spaced from the first end portion 22. In the embodiment, the touch panel can be affected by the first end portion 22 to generate the related operation command, and the user can quickly push the control portion 28 back and forth to allow the body portion 26 to contact the first end portion 22 and then quickly separate. The related operation command generated by the embodiment can achieve a click effect of the mouse.

Figure 6:
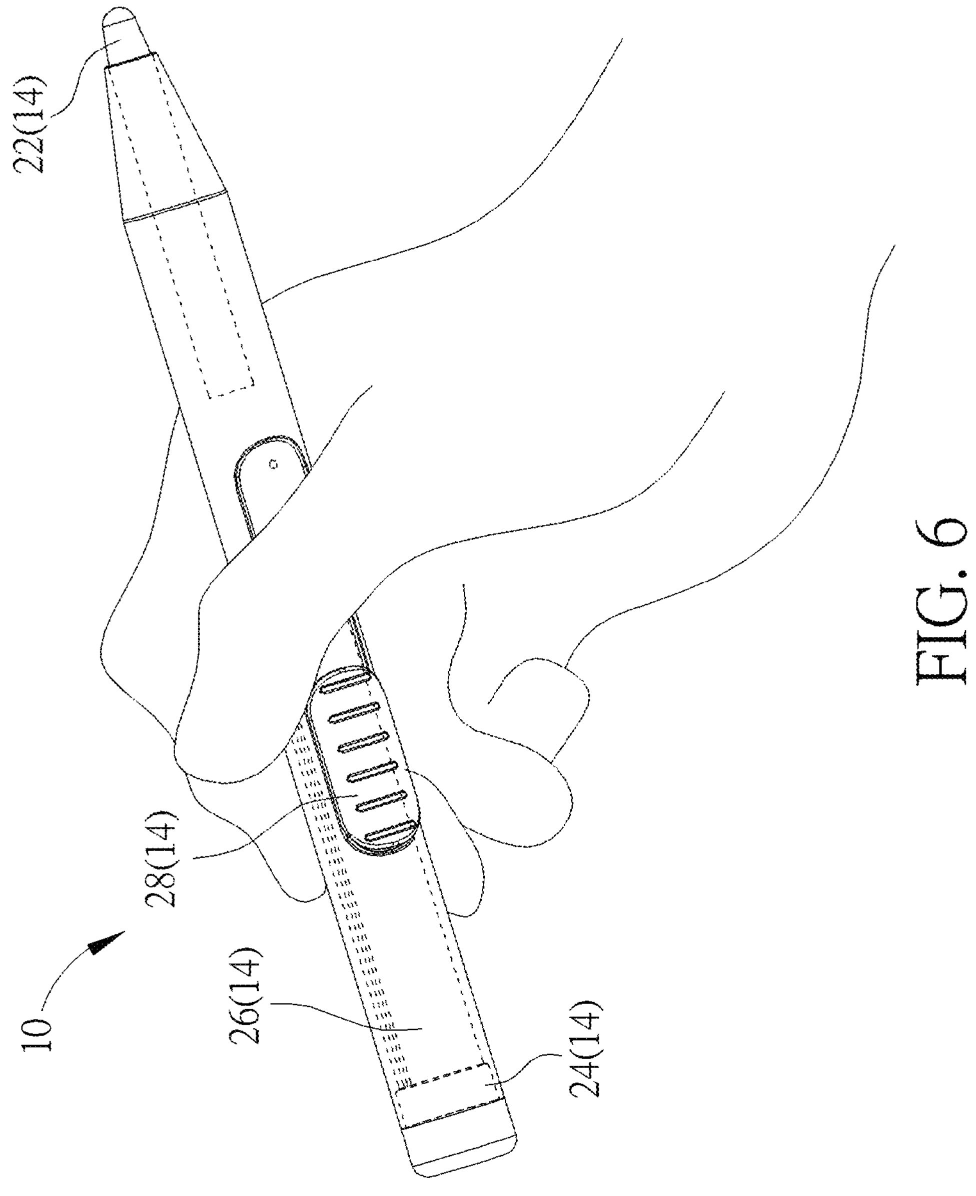
Figure 7:
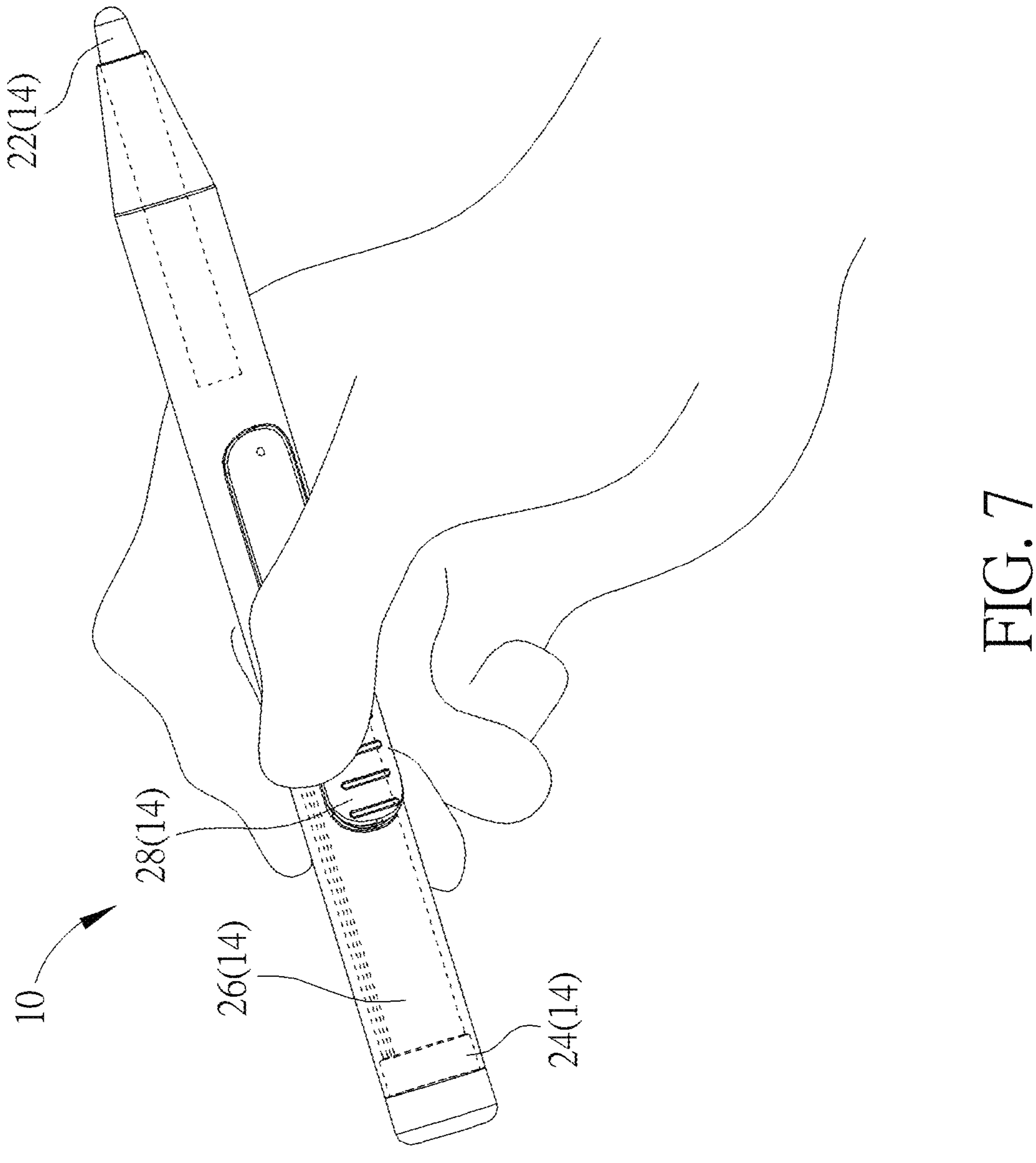

As shown in FIG. 6, the user can hold the capacitive stylus 10 in reverse and push the control portion 28 towards the tail portion 20. At this time, the second end portion 24 can contact the touch panel, and the body portion 26 can be stayed in a position of contacting the second end portion 24, and the control portion 28 is not pressed by the external object (such as the user's finger). In the embodiment, the touch panel can be affected by the second end portion 24, the body portion 26 and the control portion 28 to generate the related operation command. As shown in FIG. 7, the user can still hold the capacitive stylus 10 in reverse and push the control portion 28 towards the tail portion 20. At this time, the second end portion 24 can contact the touch panel, and the body portion 26 can be stayed in the position of contacting the second end portion 24, and the control portion 28 is pressed by the external object (such as the user's finger). In the embodiment, the touch panel can be affected by the second end portion 24, the body portion 26, the control portion 28 and the external object to generate the related operation command.

Figure 8:
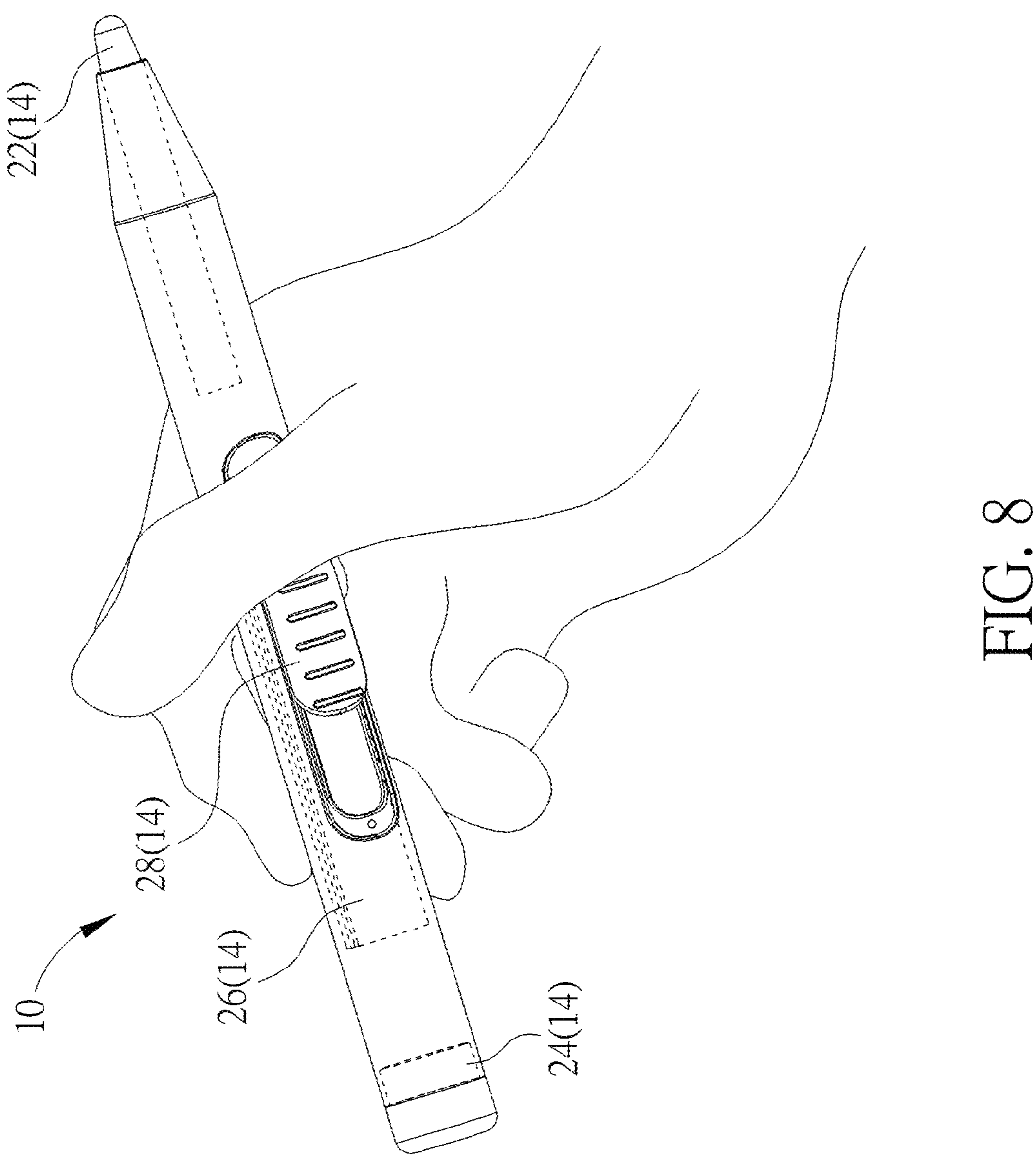

As shown in FIG. 8, the user can hold the capacitive stylus 10 in reverse to contact the second end portion 24 against the touch panel, and the control portion 28 can be positioned on the middle of the opening structure 16 so that the body portion 26 is spaced from the second end portion 24. In the embodiment, the touch panel can be affected by the second end portion 24 to generate the related operation command. The user can quickly push the control portion 28 back and forth to allow the body portion 26 to contact the second end portion 24 and then quickly separate. The related operation command generated by the embodiment can achieve the click effect of the mouse.

In conclusion, the capacitive stylus of the present application can place the first end portion, the second end portion, the body portion and the control portion of the conduction module respectively at different positions of the main body. The first end portion and the second end portion can be fixed at the tip portion and the tail portion of the main body. The body portion can contact against or be spaced from the first end portion and the second end portion in accordance with a movement of the control portion. The first end portion and the second end portion of the capacitive stylus can respectively contact against the touch panel, and the capacitive stylus can generate different operation commands due to material properties of elements of the conduction module. The body portion can optionally contact against or be spaced from the first end portion and the second end portion, or the external object can contact against or be spaced from the control portion, and the capacitance sensing changes caused thereby can provide more types of the operation command. Comparing to the prior art, the capacitive stylus of the present application does not need to be set up on the touch panel, and can provide a variety of the capacitive sensing changes to generate the related operation commands by simply operation of the control portion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive stylus applied to a touch panel, the capacitive stylus comprising:

a main body comprising an opening structure, a tip portion and a tail portion, the opening structure being located between the tip portion and the tail portion; and a conduction module, comprising:

a first end portion disposed on the tip portion or the tail portion, and adapted to contact the touch panel for generating an operation command;

a body portion movably disposed inside the main body; and a control portion disposed inside the opening structure and connected with the body portion, and adapted to contact the body portion against the first end portion or space the body portion from the first end portion;

a second end portion disposed on a position of the tip portion and/or the tail portion different from the first end portion;

wherein the control portion is adapted to further contact the body portion against the second end portion or space the body portion from the second end portion.

2. The capacitive stylus of claim 1, wherein at least one of the control portion, the first end portion and the body portion is made by conductive material.

3. The capacitive stylus of claim 2, wherein electrical conductivity of the first end portion is less than electrical conductivity of the body portion and/or the control portion.

4. The capacitive stylus of claim 1, wherein the first end portion is disposed on the tip portion and the second end portion is disposed on the tail portion.

5. The capacitive stylus of claim 1, wherein the second end portion is made by conductive material or non-conductive material.

6. The capacitive stylus of claim 5, wherein electrical conductivity of the second end portion is less than electrical conductivity of the body portion and/or the control portion.

7. The capacitive stylus of claim 1, wherein hardness of the body portion is greater than hardness of the first end portion and/or the second end portion.

8. The capacitive stylus of claim 7, wherein hardness of the control portion is greater than hardness of the body portion.

9. The capacitive stylus of claim 1, wherein when the first end portion contacts the touch panel, the body portion is stayed in a position of contacting the first end portion, and the control portion is not pressed by an external object.

10. The capacitive stylus of claim 1, wherein when the first end portion contacts the touch panel, the body portion is stayed in a position of contacting the first end portion, and the control portion is continuously pressed by an external object.

11. The capacitive stylus of claim 1, wherein when the first end portion contacts the touch panel, the body portion is stayed in a position of spacing from the first end portion by the control portion.

12. The capacitive stylus of claim 1, wherein when the first end portion contacts the touch panel, the control portion drives the body portion to switch between a position of contacting the first end portion and a position of spacing from the first end portion.

13. The capacitive stylus of claim 1, wherein when the second end portion contacts the touch panel, the body portion is stayed in a position of contacting the second end portion, and the control portion is not pressed by an external object.

14. The capacitive stylus of claim 1, wherein when the second end portion contacts the touch panel, the body portion is stayed in a position of contacting the second end portion, and the control portion is continuously pressed by an external object.

15. The capacitive stylus of claim 1, wherein when the second end portion contacts the touch panel, the body portion is stayed in a position of spacing from the second end portion by the control portion.

16. The capacitive stylus of claim 1, wherein when the second end portion contacts the touch panel, the control portion drives the body portion to switch between a position of contacting the second end portion and a position of spacing from the second end portion.

17. The capacitive stylus of claim 1, wherein at least one of the body portion and the control portion is made by metal material.

18. The capacitive stylus of claim 1, wherein at least one of the first end portion and the second end portion is made by rubber material.

* * * * *